G. W. KEENE.

Processes for Forming Heels of Boots and Shoes.

No. 5,723. Reissued Jan. 6, 1874.

WITNESSES:

N. M. Shepard

J. C. Simpson

INVENTOR:

Geo. W. Keene

AM. PHOTO-LITHOGRAPHIC Co. N.Y. (OSBORNE'S PROCESS.)

UNITED STATES PATENT OFFICE.

GEORGE W. KEENE, OF LYNN, ASSIGNOR TO DAVID ROBINSON, TRUSTEE OF THE KEENE HEELING-MACHINE ASSOCIATION, OF BOSTON, MASS.

IMPROVEMENT IN THE PROCESSES FOR FORMING HEELS OF BOOTS AND SHOES.

Specification forming part of Letters Patent No. 34,037, dated December 24, 1861; reissue No. 5,723, dated January 6, 1874; application filed December 29, 1873.

DIVISION B.

*To all whom it may concern:*

Be it known that I, GEORGE W. KEENE, of Lynn, in the county of Essex and Commonwealth of Massachusetts, have invented certain new and useful Improvements in the Mode of Making Heels for Boots and Shoes; and I do hereby declare the following to be a full, clear, and exact description of the same, reference being had to the accompanying drawings, which form a part of this specification, and in which—

Figure 1:
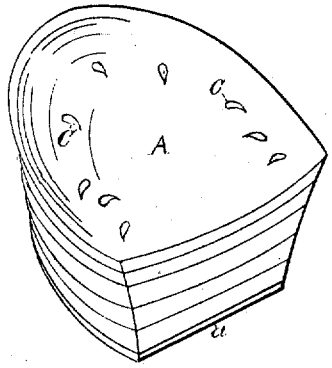
Figure 3:
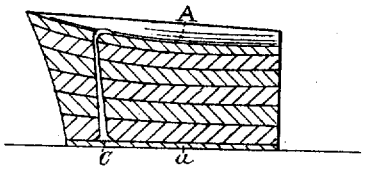
Figure 2:
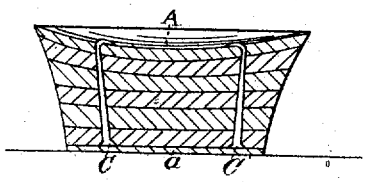

Figure 1 represents a perspective view of a heel composed of a series of leather lifts, shaped and united and held together by a series of lift-holding nails, my improved method having been practiced or employed in the production of said heel, as will be hereafter described. Fig. 2 represents a transverse section; and Fig. 3 represents a longitudinal section through the heel, showing the relative position of some of the lift-holding nails, and the bottom lift which covers the heads of the nails.

To enable those skilled in the art to which my invention belongs to use and practice my said improved method of making heels for boots and shoes, I will proceed to describe more in detail the manner in which I have carried it out.

Risers or lifts of leather are cut to near the form to be given to the heel, and are placed, in sufficient numbers to produce the required height of heel, in a press adapted to receive them, and by which press the hollow or concave seat A for the wearer's heel is formed, and the leather is compressed, the surfaces between which the heel is compressed being of iron. A series of holes for the lift-holding nails B is now made in the heel; and this may be done, by any suitable means, at the time the heel is compressed, or by a separate operation. The points of the nails C are then inserted or placed in the holes and the heels returned to a press, by the operation of which the nails are all driven simultaneously through the heel, or the several lifts composing the heel, from the tread-lift upward, and clinched above the lift which comes next to the heel part of the sole of the boot or shoe. At the same time, the heel-lifts receive a final compression, and the hollow or concave for the wearer's heel is completed.

It will thus be seen that the several lifts composing the heel are permanently secured in shape to form the desired and requisite concavity on the upper side by driving the nails, which permanently secure and hold the lifts together, while the heel is under pressure in the machine. A thin or blind lift, *a*, of leather, may then be secured to the bottom of the heel to conceal the heads of the nails; and the heel is subsequently brought to the exact form and size required by paring or cutting in a suitable machine.

The holes into which the heel-lift securing and holding nails are inserted, and through which they are afterward driven, are punched or pricked from the tread of the heel upward, and at uniform distances apart, the row or series of nail-holes following the curvature of the heel entirely around the curved part thereof.

The heel represented in the drawings was designed more particularly to be secured to the boot or shoe by nails driven from the inside of the boot or shoe, through the sole, into the heel; but it is evident that my improved method is applicable to the production of heels for boots and shoes otherwise fastened or secured to the boot or shoe.

Having described one practical mode of carrying out or applying my said improved method of shaping and permanently securing a series of lifts together to form a heel for a boot or shoe, what I claim as my invention, and desire to have secured by Letters Patent in this division of reissue, is—

1. The mode or process of making or forming a heel for a boot or shoe from a series of leather lifts by first subjecting, by means of suitable mechanism, the several lifts to pressure, whereby they are compacted together, a concave or heel seat partially formed upon the upper side of the heel; second, by suitable means, pricking the holes for the nails which are to permanently secure and hold the heel-lifts together; third, inserting the lift-holding nails in the holes thus formed; and, fourth, by means of suitable mechanism, simultaneously driving all the nails from the tread-lift upward through the several lifts composing the heel, and clinching their points, while the heel is under pressure.

2. The mode or process of compacting and uniting a series of leather lifts together to form a heel for a boot or shoe by subjecting, by means of suitable mechanism, the several lifts to pressure on top and bottom at the same time that the heel seat or concavity is completed, and the heel-lift holding and securing nails are all simultaneously driven from the tread-lift upward through the heel, and their points clinched or riveted down, before the heel-lifts are relieved or released from pressure, thereby retaining the heel in the shape pressed.

GEO. W. KEENE.

Witnesses:
M. W. SHEPARD,
G. C. STIMPSON.